United States Patent [19]

Ferez

[11] Patent Number: 4,601,482
[45] Date of Patent: Jul. 22, 1986

[54] SELF PROPELLED WAGON

[75] Inventor: Marcio C. Ferez, Hialeah, Fla.

[73] Assignee: Ferez Industries, Inc., Fla.

[21] Appl. No.: 709,135

[22] Filed: Mar. 7, 1985

[51] Int. Cl.⁴ .................. B62K 21/00; B62M 1/16
[52] U.S. Cl. .................................... 280/265; 280/282
[58] Field of Search ............... 280/240, 246, 269, 257, 280/282, 265, 267, 268, 272, 247, 255

[56] References Cited

U.S. PATENT DOCUMENTS

| 1,536,788 | 5/1925 | Grady | 280/240 |
| 1,849,018 | 3/1932 | Parker | 280/265 |
| 3,069,182 | 12/1962 | Hufford | 280/267 X |

Primary Examiner—John J. Love
Assistant Examiner—Mitchell J. Hill
Attorney, Agent, or Firm—Jesus Sanchelima

[57] ABSTRACT

A self-propelled wheeled wagon having cargo and seat sections. The user transmits a reciprocating movement, through a propelling mechanism, to the on of the rear wheel. The steering is achieved by directly moving the pivoting front wheels axle with the user's feet. The front wheels axle is provided with an axle stopper mechanism that prevents the axle from moving beyond a predetermined angle thereby minimizing the probability of injuring the user.

4 Claims, 9 Drawing Figures

FIG-1-

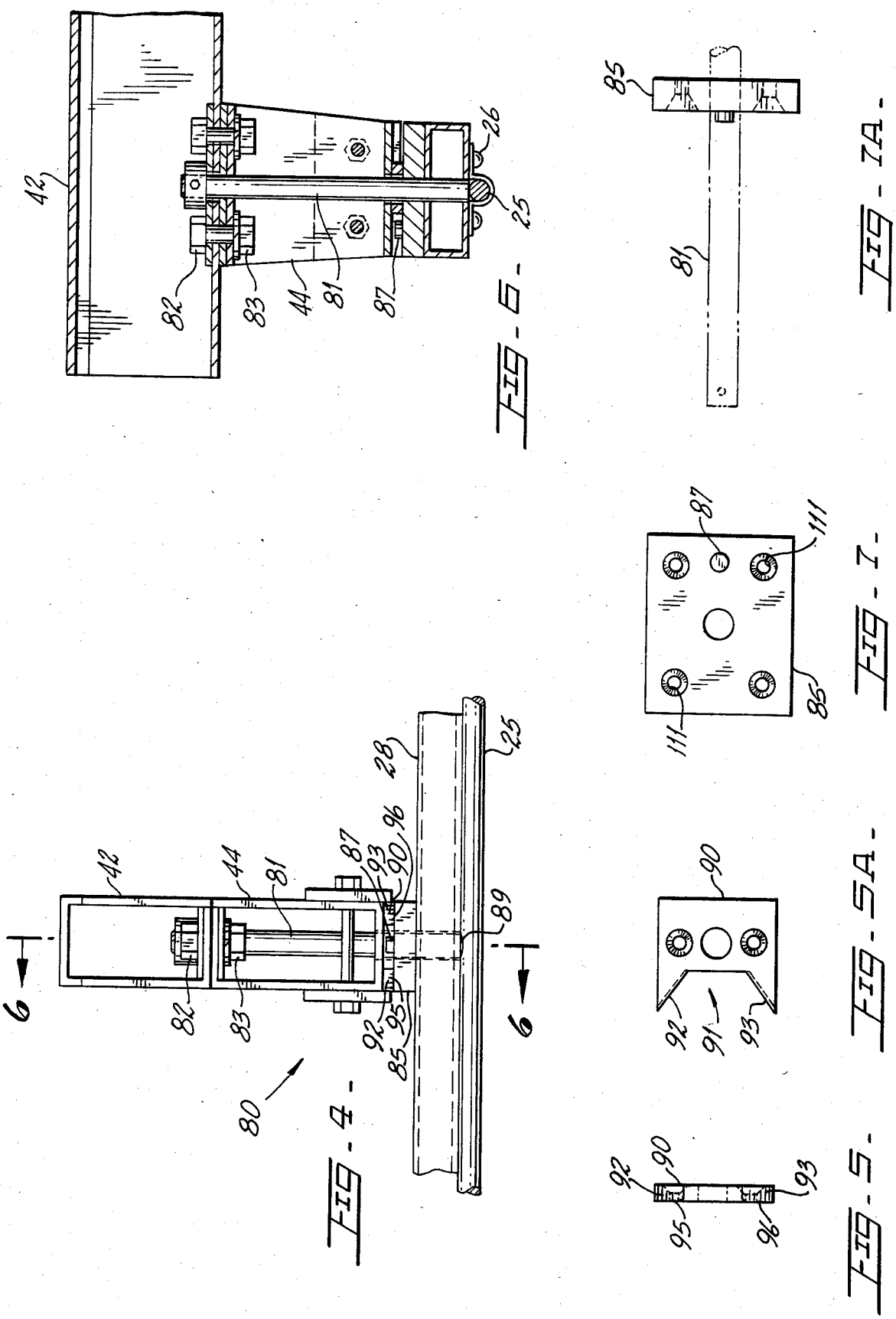

SELF PROPELLED WAGON

BACKGROUND OF THE INVENTION

1. Field of the Invention

The present invention relates to self-propelled wagons.

2. Description of the Prior Art

It is well documented that the average person's physical fitness has been decaying over the years for lack of exercising. The present invention help's to solve this problem by providing a wagon that is fun to use and provides a complete exercise. A number of self-propelled wagons have been designed in the past, primarily, as toys. For example, U.S. Pat. No. 1,536,788 issued to T. Grady in 1925 specifically states (on page 1, line 10) that the vehicle is intended to be used by children. The construction, therefore, is not sturdy enough to be used by an adult. Gradys's vehicle is steered by steering wheel 22 and universal joint connection 24. Here, the steering is simply and directly done by moving the front wheels' axle with the user's feet, and including a stopper mechanism that prevents injury to the user. Other features that make the present invention suitable for everyday use by adults and children for exercise and transportation routines will be apparent from the specifications below.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a self-propelled vehicle that is sturdy enough to transport an adult so that his or her transportation needs may be met while he or she is simultaneously exercising.

It is another object of this invention to provide such a vehicle that is inexpensive and simple to manufacture.

It is still another object of the present invention to provide a vehicle that can be used where conventional internal combustion or electric vehicles can not be used such as in places with flammable atmospheres.

It is yet another object of the present invention to provide a vehicle that is easy to maneuver and maintain.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a partial view of the stopper mechanism provided to the front steering member.

FIG. 5 shows a side view of the stopper plate of the stopper mechanism.

FIG. 5A is a top view of the plate shown in FIG. 5.

FIG. 6 illustrates a cross section view of the partial view shown in FIG. 4, along line 6—6.

FIG. 7 is a top view of the moving plate of the stopper mechanism.

FIG. 7A represents a side view of the moving plate shown in FIG. 7.

DETAILED DESCRIPTION OF THE PREFERRED EMBODIMENT

Figure 1:
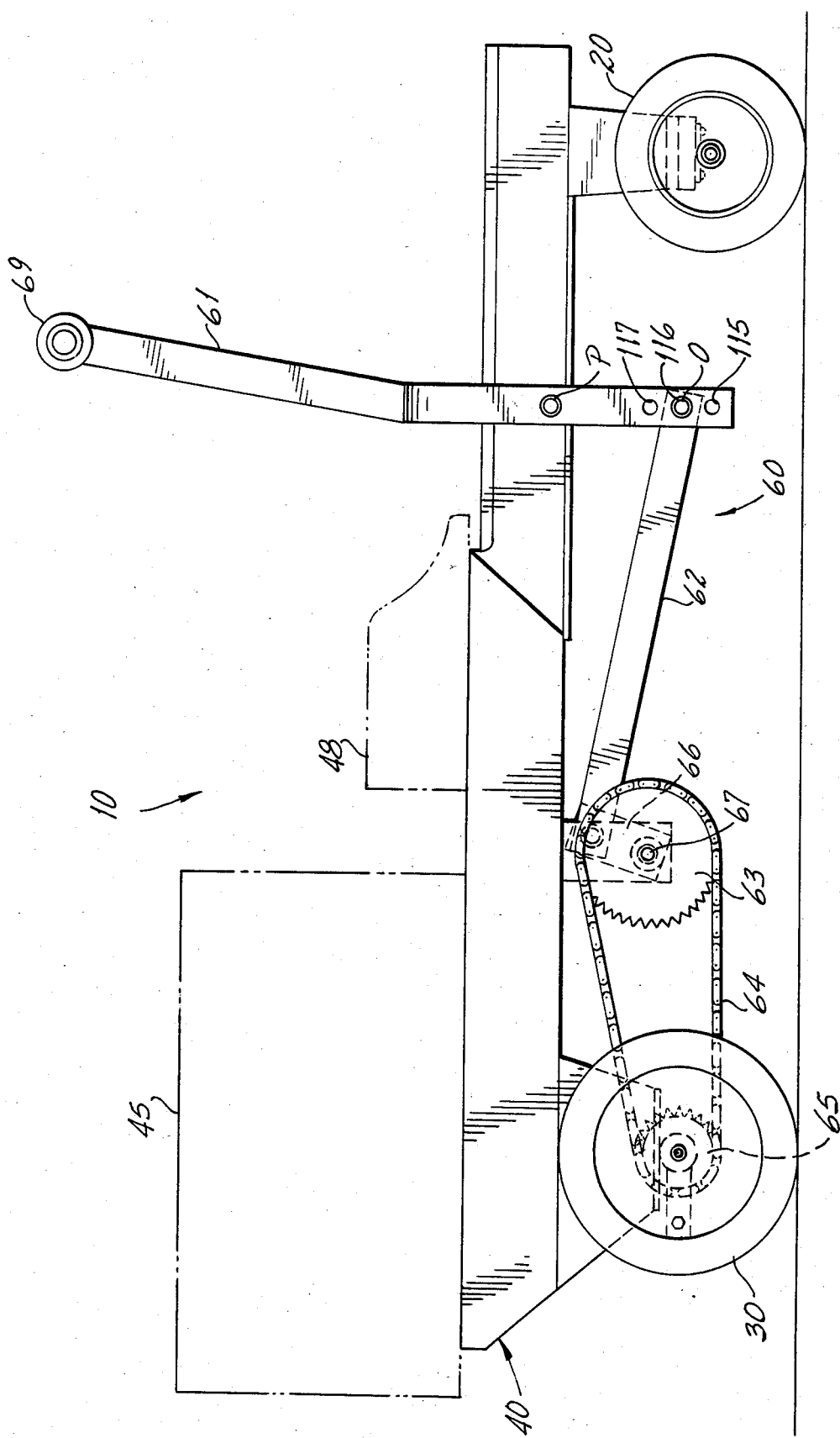
FIG. 1 is a side view of the wagon.

Referring now to FIG. 1 where the wagon is generally referred to by numeral 10, it can be observed that it has front wheels 20, rear wheels 30 and body 40, that includes an underside. Wagon 10 is made out of a light material that provides the required structural integrity with low weight, for example, aluminum (as in the preferred embodiment) wood, plastic or fiberglass. Body 40 includes a cargo section 45, seat section 48 of wagon 10 and three chassis members 41; 42 and 43, as shown in FIG. 2.

Figure 2:
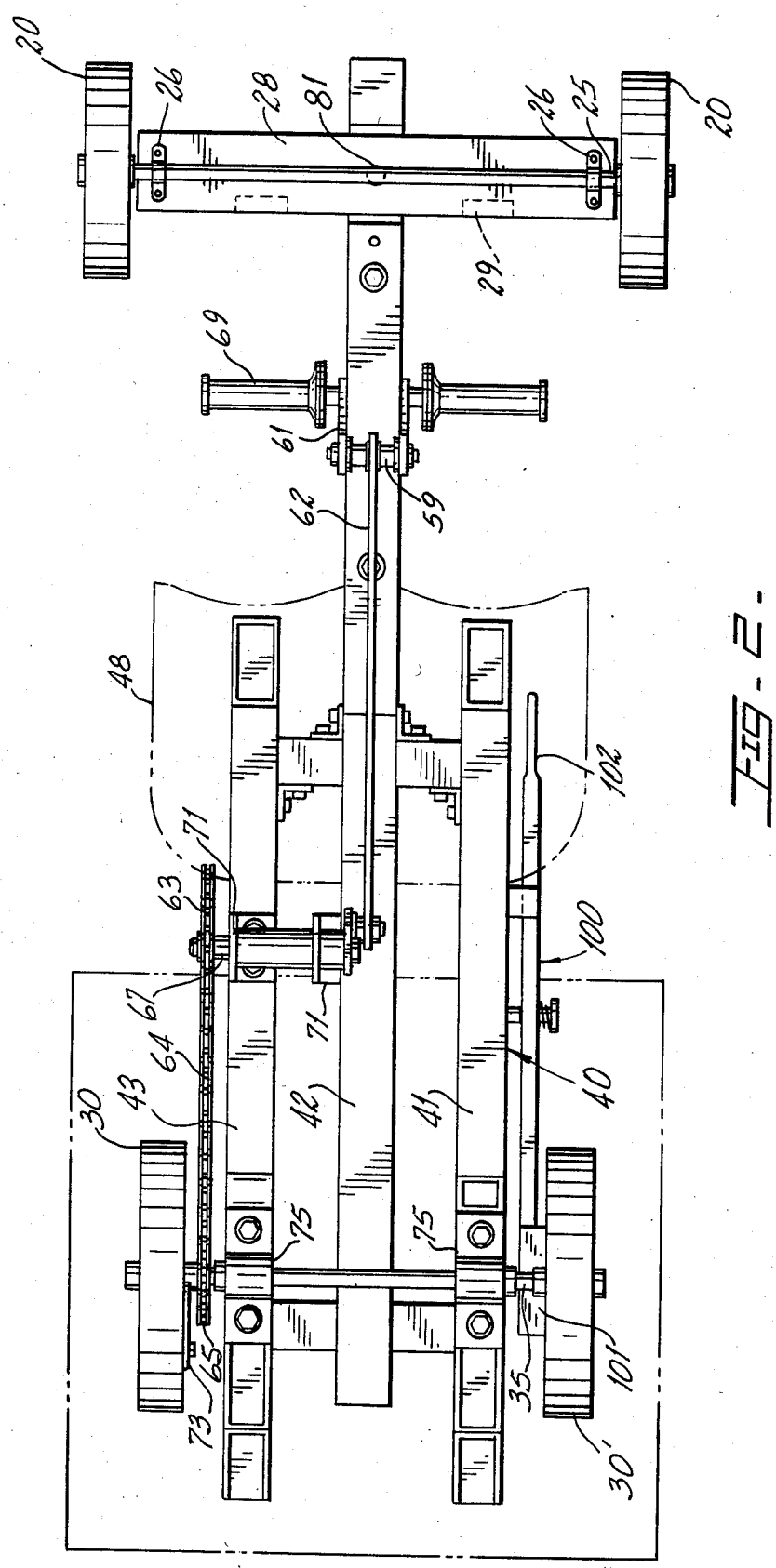
FIG. 2 shows a bottom view of the wagon.

A propelling mechanism 60, see FIGS. 1 and 2, includes, basically, shaft 61, chain 64, link members 62 and 66, front and rear sprocket wheels 63 and 65. Shaft 61 is provided, in the preferred embodiment, with holes 115; 116 and 117 for changing the force required from the user. Shaft 61 has handle bar 69 rigidly mounted on its upper end. Link member 62 is pivotally joined to shaft 61 at point 0 through pin 59. Shaft 61 is pivotally mounted on body 40 at point P. Link member 66 is pivotally joined to the other end of link member 62 on one end and the other end of member 66 is rigidly mounted to sprocket axle 67, so that the back and forth movement of member 62 is converted to a rotational movement of link member 66. A reciprocating motion on shaft 61 is then transmitted to sprocket wheel 63 to eventually cause wheel 30 to rotate through chain 64 that is trained over rear sprocket wheel 65 which is rigidly mounted on axle 35. As shown in FIG. 2, bearing assemblies 71 are mounted to the underside of chassis members 42 and 43 of body 40 and support axle 67. Bearing assemblies 75 are mounted to the underside of chassis members 41 and 43 supporting axle 35.

Wheel 30 is rigidly mounted to one end of axle 35 through plate 73 which is rigidly mounted on one end to axle 35 and the other end is rigidly mounted to the inner part of wheel 30. Wheel 30' is freewheeling on the other end of axle 35. Wheels 30 and 30' are interchangeable. Wheels 20 are mounted freewheeling to the ends of axle 25. Feet support member 28 is pivotally mounted to the front end of chassis member 42 of body 40. Bearing assemblies 26 are mounted to the underside of member 28 and support axle 25. Foot pads 29 on feet support member 28 allow the user to steer wagon 10 easily be providing a suitable high friction area where the user's feet are positioned.

As shown in FIG. 4, to prevent injuries, a stopper mechanism 80 precludes shaft 25 from rotating excessively. Shaft 81 of stopper mechanism 80 is rigidly mounted (soldered in the preferred embodiment) to axle 25, on one end 89. The other end extends upwardly through extension member 44 and into chassis member 42. This upper end of shaft 81 includes a threaded portion and a pair of locknuts 82 and 83 that sandwich the adjoining sides of members 42 and 44 together but allowing shaft 81 to rotate. Moving plate 85, shown in FIGS. 4 and 7, is rigidly mounted to member 28 through screws 111. Plate 85 then rotates with the movement of member 28 produced by the user's feet. Stopper plate 90 has a bay 91 partially defined by angular walls 92 and 93; as shown in FIG. 5A. The undersides 95 and 96 of walls 92 and 93 are chamfered to prevent cutting off protrusion 87. Plate 90 is rigidly mounted to the underside of extension member 44. Protrusion 87 on plate 85 is constrained to rotate to an angle that is defined by said angular walls 92 and 93.

Figure 3:
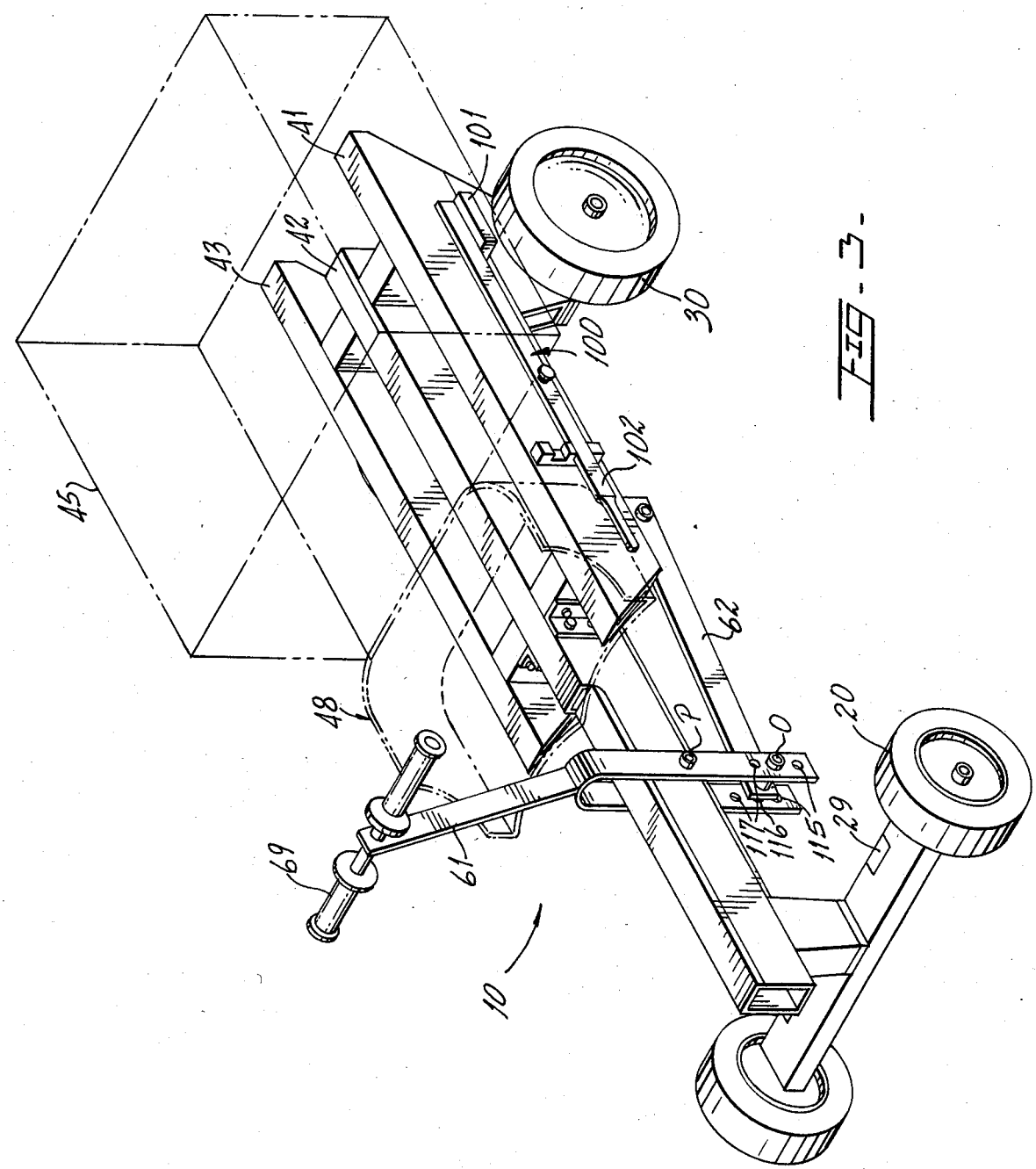
FIG. 3 represents a view in perspective of the wagon.

An emergency brake mechanism 100 is shown in FIG. 3 and it includes a brake pad 101 and arm 102 pivotally mounted to the body 40 of the vehicle 10.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. An improved self-propelled wagon, comprising:
  A. a body having an underside including a stopper plate member mounted to said body's underside and said stopper plate member includes a bay having two angular walls chamfered;
  B. front axle means pivotally mounted on the front end of said body having one freewheeling wheel mounted on each end, and further including stopper means that prevent said front axle means from turning beyond a predetermined angle so that it can be safely used to steer said wagon with the user's feet and said stopper means further having a moving plate member rigidly mounted to the upper side of said front axle means having an upwardly extending protrusion and said protrusion in cooperation with said stopper plate member constrains the angular movement of said moving plate, and consequently of said front axle means;
  C. rear axle means mounted on the rear end of said body and having one wheel rigidly mounted on one end and a freewheeling wheel mounted on the other end of said rear axle means; and
  D. propelling mechanism means for transmitting the human force of the user to said rear axle means.

2. The wagon set forth in claim 1 wherein said propelling mechanism means include a shaft that is pivotally mounted to said body member having a perpendicularly mounted handle bar on its upwardly extending end and its other end extending downwardly under said chassis ending a distance above the floor and having linkage means adapted to transmit the reciprocating force imparted to said shaft to said rear axle means in the form of a rotational force.

3. The wagon set forth in claim 2 wherein said shaft includes a plurality of holes on its lower end so that said linkage means may be removably mounted to one of said holes depending on how hard the user wants to exercise.

4. The wagon set forth in claim 3 wherein said propelling mechanism means include first sprocket means having a sprocket axle on which a first sprocket wheel is rigidly mounted, second sprocket means having a second sprocket wheel rigidly mounted on said rear wheel axle, and chain means trained over said first and second sprocket wheels.

* * * * *